(12) United States Patent
Kagan

(10) Patent No.: US 10,260,903 B2
(45) Date of Patent: Apr. 16, 2019

(54) METER HAVING A COMMUNICATION INTERFACE FOR RECEIVING AND INTERFACING WITH A COMMUNICATION DEVICE

(75) Inventor: Erran Kagan, Great Neck, NY (US)

(73) Assignee: ELECTRO INDUSTRIES/GAUGE TECH, Westbury, NY (US)

( * ) Notice: Subject to any disclaimer, the term of this patent is extended or adjusted under 35 U.S.C. 154(b) by 0 days.

(21) Appl. No.: 13/204,160

(22) Filed: Aug. 5, 2011

(65) Prior Publication Data
US 2012/0026006 A1 Feb. 2, 2012

Related U.S. Application Data

(63) Continuation of application No. 10/958,456, filed on Oct. 5, 2004, now Pat. No. 7,994,934.

(51) Int. Cl.
*G01D 4/00* (2006.01)
*G06Q 20/38* (2012.01)

(52) U.S. Cl.
CPC .......... *G01D 4/004* (2013.01); *G06Q 20/3829* (2013.01); *Y02B 90/242* (2013.01); *Y04S 20/322* (2013.01)

(58) Field of Classification Search
CPC ....................................................... G01D 4/004
(Continued)

(56) References Cited

U.S. PATENT DOCUMENTS 3,748,654 A * 7/1973 Sutherland ............ G01F 15/063
174/480
4,713,609 A 12/1987 Losapio et al.
(Continued)

FOREIGN PATENT DOCUMENTS

WO    WO98/54583    12/1998

OTHER PUBLICATIONS http://www.landisgyrus/Landis_Gyr/Meters/2510_socket_meter. asp; dated Mar. 21, 2005; 16 pages.
(Continued)

*Primary Examiner* — Albert K Wong
(74) *Attorney, Agent, or Firm* — Gerald E. Hespos; Michael J. Porco; Matthew T. Hespos

(57) ABSTRACT

A meter is provided having a communication interface for receiving and interfacing with a communication device for transmitting measurement and other data to a central computer station via the communication device. The meter includes a measurement module for obtaining measurement data and a processor having a memory for storing application software for communicating the measurement and other data to the communication interface. The data are then provided to the communication device via the communication interface. The communication device is preferably a plug-and-play PCMCIA-type card or other type of memory card having a processor and a connection port for connecting to a port adaptor of the communication interface for receiving the data via the connection port-port adaptor connection. The communication device further includes communication circuitry for communicating the received data to the central computer station via one or more communications networks according to a communications protocol pre-programmed within the processor.

22 Claims, 2 Drawing Sheets

(58) Field of Classification Search
USPC .......................... 340/870.02, 870.28, 870.3
See application file for complete search history.

(56) References Cited

U.S. PATENT DOCUMENTS

| | | | |
|---|---|---|---|
| 4,803,632 A * | 2/1989 | Frew .................... | G01D 4/006 340/12.32 |
| 5,252,967 A * | 10/1993 | Brennan, Jr. .......... | G01D 4/004 340/10.51 |
| 5,459,459 A | 10/1995 | Lee, Jr. | |
| 5,528,507 A | 6/1996 | McNamara et al. | |
| 5,555,508 A | 9/1996 | Munday et al. | |
| 5,631,554 A | 5/1997 | Briese et al. | |
| 5,631,843 A | 5/1997 | Munday et al. | |
| 5,680,324 A | 10/1997 | Swelter, III et al. | |
| 5,715,390 A | 2/1998 | Hoffman et al. | |
| 5,734,571 A | 3/1998 | Pilz et al. | |
| 5,736,847 A | 4/1998 | Van Doorn et al. | |
| 5,742,512 A | 4/1998 | Edge et al. | |
| 5,898,387 A * | 4/1999 | Davis .................... | G01R 11/04 340/637 |
| 5,963,734 A | 10/1999 | Ackerman et al. | |
| 6,181,257 B1 * | 1/2001 | Meek et al. ............. | 340/870.01 |
| 6,275,168 B1 * | 8/2001 | Slater .................... | G01R 22/00 324/110 |
| 6,424,270 B1 * | 7/2002 | Ali .......................... | 340/870.02 |
| 6,459,258 B1 | 10/2002 | Lavoie et al. | |
| 6,486,652 B1 | 11/2002 | Ouellette et al. | |
| 6,504,357 B1 | 1/2003 | Hemminger et al. | |
| 6,538,577 B1 * | 3/2003 | Ehrke et al. ............. | 340/870.02 |
| 6,591,229 B1 | 7/2003 | Pattinson et al. | |
| 6,735,535 B1 | 5/2004 | Kagan et al. | |
| 6,778,920 B1 | 8/2004 | Balch et al. | |
| 6,784,806 B1 | 8/2004 | Lee et al. | |
| 6,813,571 B2 | 11/2004 | Lightbody et al. | |
| 6,825,776 B2 * | 11/2004 | Lightbody et al. ...... | 340/870.02 |
| 6,871,150 B2 | 3/2005 | Huber et al. | |
| 6,885,185 B1 | 4/2005 | Makinson et al. | |
| 6,889,271 B1 | 5/2005 | Germer et al. | |
| 6,954,814 B1 | 10/2005 | Leach | |
| 7,009,379 B2 * | 3/2006 | Ramirez .................... | 324/142 |
| 7,245,502 B2 * | 7/2007 | Kochis .................... | H04W 88/02 361/760 |
| 2002/0039068 A1 * | 4/2002 | Holowick ............... | 340/870.02 |
| 2002/0161536 A1 | 10/2002 | Suh et al. | |
| 2003/0184448 A1 * | 10/2003 | Kagan .................... | 340/870.28 |
| 2004/0004555 A1 * | 1/2004 | Martin .................... | H04Q 9/00 340/870.02 |
| 2004/0070517 A1 | 4/2004 | Ehrke et al. | |
| 2004/0084914 A1 * | 5/2004 | Karimi .................... | E01H 1/1206 294/1.3 |
| 2005/0060436 A1 * | 3/2005 | Kienhoefer ............. | H04W 4/18 710/1 |
| 2005/0125361 A1 | 6/2005 | Girsham et al. | |
| 2005/0215244 A1 | 9/2005 | Whitson | |
| 2006/0023853 A1 | 2/2006 | Shelley et al. | |
| 2006/0082468 A1 | 4/2006 | Wang et al. | |
| 2008/0136667 A1 * | 6/2008 | Vaswani .................... | G01D 4/004 340/870.02 |

OTHER PUBLICATIONS

PowerLogic Circuit Monitor Series 2000 Reference Manual; Square D Company; Instruction Bulletin No. 3020IM9806; Feb. 1999.

DX-9100 Extended Digital Controller Technical Manual; Johnson Controls, Inc. Code No. LIT-6364020; Aug. 1996.

Sezi et al., "New intelligent electronic devices change the structure of power distribution systems", Oct. 1999, Industry Applications Conference, 1999. 34th IAS Meeting Conference Record of the 1999 IEEE, vol. 2, pp. 944-952.

\* cited by examiner

METER HAVING A COMMUNICATION INTERFACE FOR RECEIVING AND INTERFACING WITH A COMMUNICATION DEVICE

The present application is a continuation application of U.S. application Ser. No. 10/958,456, filed Oct. 5, 2004 now U.S. Pat. No. 7,994,934, the contents of which are hereby incorporated by reference in its entirety.

BACKGROUND OF THE INVENTION

1. Technical Field

The present disclosure relates generally to meters of the type used to measure power usage, fluid flow, etc. In particular, the present disclosure relates to a meter having a communication interface for receiving and interfacing with a communication device.

2. Background of the Related Art

Meters are generally installed by utility companies to measure, for example, the amount of energy used by a customer in order to properly bill the customer for the amount of energy used during a specific time period. The most common method for reading the meter to obtain measurements of power usage, etc. is for an individual to visit the location of the meter, visually make a reading by viewing the meter's electronic display or other type of display, such as a series of dials, etc., and record the viewed measurement. The individual may also opt to use a wireless electronic meter reading device, such as a device is capable for example to communicate with a meter's IrDA port when the device is placed in proximity to the IrDA port and along the line-of-sight of the IrDA port. Another type of wireless electronic meter reading device includes a short-range RF receiver for communicating with a meter's short-range RF transmitter when the device is in proximity to the meter. The obtained measurements are then manually inputted or downloaded to a central computer station for billing and other purposes.

An additional method of reading meters is via a communications infrastructure having one or more communications networks, such as PSTN, cellular network, satellite network, Internet, Ethernet, Intranet, LAN, WAN, and other types of networks, capable of transmitting data according to one or more communications protocols, such as CDMA, TDMA, 3G, Internet protocol, Bluetooth, etc., to the central computer station. Accordingly, such meters are equipped with communication circuitry which includes at least a transmitter and an antenna for wirelessly or non-wirelessly transmitting data to a communications network of the communications infrastructure according to a communications protocol. A segment or portion of the communication circuitry is generally provided to the meter at the time of manufacture in the form of an embedded ASIC chip which also performs other functions of the meter.

As such in prior art meters, the circuitry responsible for providing the meter's remote communication capabilities cannot easily be separated from the circuitry which provides the meter's non-communication capabilities. Hence, if a utility company desires to change from one communication infrastructure to another, and/or switch to another communications network and/or communications protocol, the utility company is generally required to replace every meter in the field with meters having the desired communication capabilities.

For example, if a utility company has installed in a city power usage meters capable of communicating with the central computer station via a cellular network leased from a cellular service provider and operating according to the CDMA communications protocol and then the utility company desires to lease another cellular network from another cellular service provider which operates according to the 3G communications protocol, the utility company would have to replace every power usage meter in the city with power usage meters capable of communicating according to the 3G communications protocol. This is very costly and time consuming.

A need therefore exists for a meter having a communication interface for receiving and interfacing with a communication device for communicating with a central computer station. A need also exists for a method for effectively and inexpensively switching from one communications infrastructure to another, where each communications infrastructure may include different communications networks and/or communications protocols.

SUMMARY OF THE INVENTION

The present disclosure provides a meter having communication capabilities and which overcomes the disadvantages of the prior art. In particular, the present disclosure provides a meter having a communication interface for receiving and interfacing with a communication device for transmitting measurement and other data to a central or remote computer station via the communication device. The meter includes a measurement module for obtaining measurement data and a processor (or ASIC) having a memory for storing application software capable of being executed by the processor for performing various functions of the meter, such as running diagnostic tests, obtaining measurement data, and operating a display.

The application software is also executed for communicating the measurement and other data to the communication interface. The data are then provided to the communication device via the communication interface from where it is transmitted to the central computer station via a communications infrastructure. Preferably, the communication device is powered by the meter via the communication interface. The communication device is equipped with communication circuitry and application software for transmitting the measurement and other data via a communications network according to a communications protocol as known in the art.

The communication device is preferably a plug-and-play PCMCIA-type card or other type of memory card having a processor (or ASIC) and a connection port for connecting to a port adaptor of the communication interface for receiving measurement and other data via the connection port-port adaptor connection. The communication device further includes communication circuitry for communicating the received measurement and other data to the central computer station via one or more communications networks, such as PSTN, cellular network, satellite network, Internet, Ethernet, Intranet, LAN, WAN, etc., of a communications infrastructure according to a communications protocol, such as CDMA, TDMA, 3G, Internet protocol, Bluetooth, etc., pre-programmed within the processor.

The communication device may also be, for example, a cellular phone having a port connector capable of connecting to the communication interface for receiving the measurement and other data via the port connector-communication interface connection and for transmitting the measurement and other data to the central computer station via a CDMA cellular communications network according to the CDMA communications protocol. The communication device may also be, for example, a PDA having a port connector capable of connecting to the communication interface for receiving the measurement and other data via the port connector-communication interface and for transmitting the received measurement and other data to a PSTN, from where it is transmitted through the Internet according to the Internet protocol, and then to another PSTN connected to the central computer station.

The present disclosure further provides a method for effectively and inexpensively switching from a first communications infrastructure to a second communications infrastructure for receiving measurement data at a central or remote computer station from a plurality of meters. Each meter includes a measurement module for obtaining measurement data; and a communication interface configured for receiving the measurement data. The method includes the step of interfacing each of the plurality of meters with a first communication device via the communication interface. The first communication device is adapted to communicate with the central computer station via the first communications infrastructure. The method further includes the step of removing the first communication device from each of the plurality of meters and interfacing each of the plurality of meters with a second communication device via the communication interface. The second communication device is adapted to communicate with the central computer station via the second communications infrastructure.

BRIEF DESCRIPTION OF THE DRAWINGS

Preferred embodiments of the present disclosure are described hereinbelow with reference to the drawings wherein.

DETAILED DESCRIPTION OF THE PREFERRED EMBODIMENTS

Figure 1:
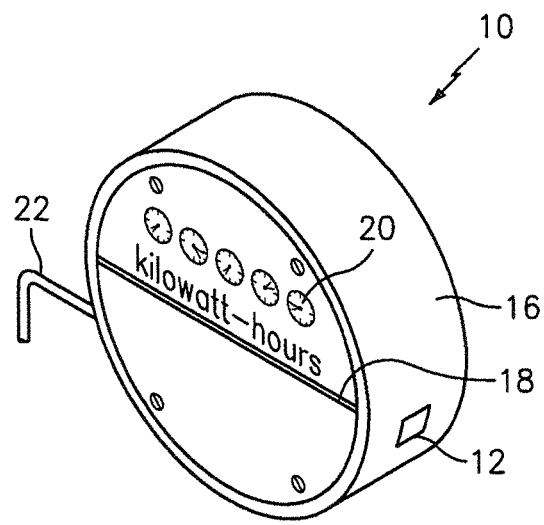
FIG. 1 is a perspective view of a meter having a communication interface for receiving and interfacing with a communication device in accordance with the present disclosure.

Referring now in detail to the drawing figures, in which like references numerals identify similar or identical elements, there is illustrated in FIG. 1 a meter constructed in accordance with a preferred embodiment of the present disclosure and is designated generally by reference numeral 10. Meter 10 is preferably of the type used for measuring power and/or energy use, such as for example, an electric current meter. However, other types of meters, such as, for example, gas, oil, pressure, and water or other fluid measuring meters, are contemplated within the scope of the present disclosure.

With reference to FIGS. 1-4, meter 10 includes a communication interface 12 for receiving and interfacing with a communication device 14 which is located in proximity to meter 10. Communication device 14 transmits the measurement and other data to a central or remote computer station.

Figure 5A:
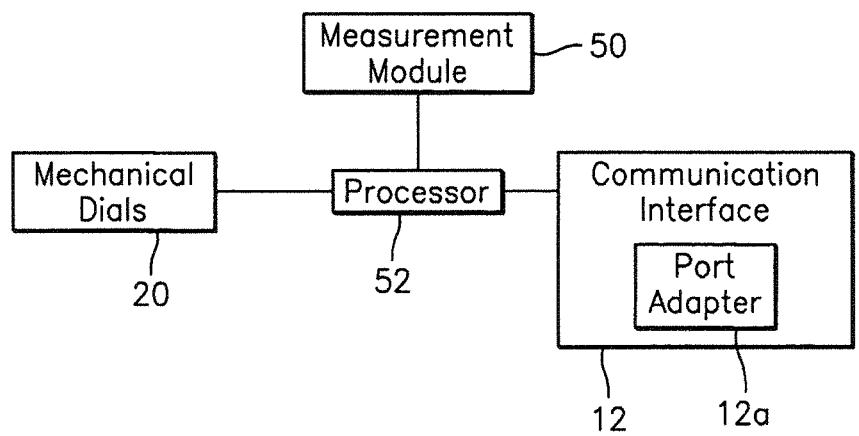
FIGS. 5a and 5b are block diagrams of the meter shown by FIG. 1 and the communication device shown by FIG. 3.

Meter 10 further includes a glass housing 16; a rotating wheel 18; a series of mechanical dials 20 for displaying, for example, kilowatt-hours (the dials can be replaced by a digital display as known in the art) as measured by a measurement module 50 (see FIG. 5a); and power line 22 for powering meter 10.

Measurement module 50 includes circuits, components and devices for measuring power usage, fluid flow, etc. as known in the art.

Figure 2:
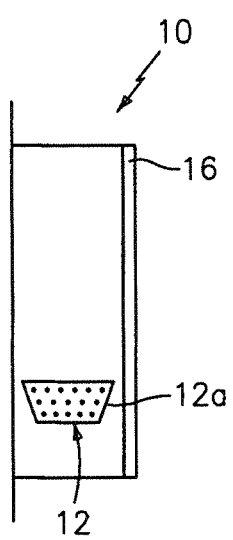
FIG. 2 is an enlarged side view of the meter of FIG. 1 showing the communication interface.
Figure 3:
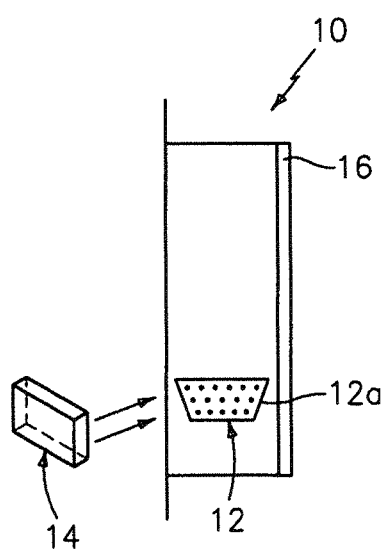
FIG. 3 is an enlarged side view of the meter of FIG. 1 showing a communication device being received by and interfaced with the communication interface.
Figure 4:
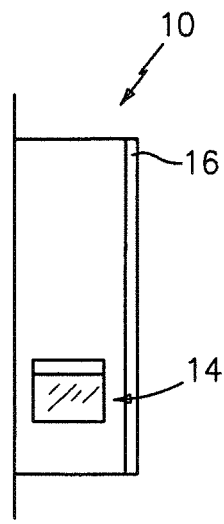
FIG. 4 is an enlarged side view of the meter of FIG. 1 showing the communication device interfaced with the communication interface.

Communication interface 12 includes a port adaptor 12a and communication device 14 includes a connection port 24 for connecting to port adaptor 12a, in order for communication interface 12 to communicate measurement and other data to communication device 14 via the connection port-port adaptor connection as shown by FIG. 4. The connection is preferably achieved via an edge connector scheme as known in the art. Glass housing 16 defines an opening for placement of port adaptor 12a as shown by FIG. 2. The opening enables the communication device 14 to be interfaced with the meter 10 without opening the housing 16 as indicated by the arrows in FIG. 3. Likewise, the communication device 14 may be removed from the housing 16 without opening the housing when replacing the communication device 14 with one of a different communication protocol. Once disposed in the opening of the housing 16 and interfaced with the meter 10, the communication device 14 is accessible externally from the housing 16 as shown in FIG. 4.

Other data transmitted to communication device 14 can include the name and address of the customer, an account number corresponding to the customer, the date and time of transmission of the measurement data, the date and time of the last transmission of the measurement data, the amount to be billed to the customer, etc.

Other data transmitted to communication device 14 can include a security key which is deciphered or decoded by a decoder 61 (see FIG. 5b) of communication device 14. Upon the security key being decoded, a signal is transmitted by a processor 60 (or ASIC) of communication device 14 to a processor 52 (or ASIC) (see FIG. 5a) of meter 10 via communication interface 12. The signal is embedded with the decoded security key. After receiving the signal, processor 52 determines that the signal is embedded with the decoded security key and transmits the measurement data to communication device 14. If decoder 61 of communication device 14 cannot decode the security key, the signal cannot be embedded with the decoded security key and transmitted to processor 52 of meter 10 for enabling the transmission of the measurement data to communication device 14.

Communication device 14 includes communication circuitry 62 (see FIG. 5b) for transmitting the measurement and other data to the central computer station via known methods, such as RF transmission, cellular transmission, satellite transmission, etc. Communication circuitry 62 can also receive data transmitted from the central computer station via known methods, such as RF transmission, cellular transmission, satellite transmission, etc. Communication device 14 can then transmit the received data to meter 10 via communication interface 12.

The data received from the central computer station by communication device 14 and transmitted to meter 10 can include, for example, instructions for meter 10 to perform one or more diagnostic tests and software updates for appending or overwriting application software stored within processor 52 of meter 10. The application software is capable of being executed by processor 52 of meter 10 for performing various functions of meter 10, such as running diagnostic tests, obtaining measurement data, and operating a display.

The application software is also executed by processor 52 for communicating the measurement and other data to communication interface 12 for being routed or transmitted to communication device 14 from where it is transmitted to the central computer station via a communications infrastructure having one or more communications networks, such as PSTN, cellular network, satellite network, Internet, Ethernet, Intranet, LAN, WAN, etc., operating according to one or more communications protocols, such as CDMA, TDMA, 3G, Internet protocol, Bluetooth, etc. Accordingly, communication device 14 includes application software for transmitting the measurement and other data via a communications network of the communications infrastructure according to a communications protocol pre-programmed within processor 60 of communication device 14. The central computer station utilizes the measurement and other data received from a plurality of meters 10 in the field for billing and other purposes as known in the art.

Processor 52 can store the data to be transmitted to the central computer station in a memory, such as SRAM and DRAM, and transmit the data on a periodic basis to the central computer station. As such, processor 52 includes a timer for clocking a predetermined amount of time, for example, 30 days, before transmitting the data to the central computer station. The data can also be transmitted to the central computer station after processor 52 receives a signal from the central computer station to transmit the data.

In a preferred embodiment as shown by the figures, port adaptor 12a is a serial port adapter. However, it is contemplated that a parallel port adapter or other type of port adaptors can be provided to communication interface 12. It is also contemplated that the interfacing between communication interface 12 and communication device 14 in proximity to meter 10 can be achieved via wireless communication means, such as a short range RF link, infrared link utilizing, for example, at least one IrDA port, etc.

Serial port adapter 12a is preferably a 16-pin serial port adapter where pins 1 through 7 are standard IEEE RS232 interface pins; pins 8 through 10 are EEPROM card identifier pins; pins 11 through 13 provide grounding for communication device 14; and pins 14 through 16 provide power to the communication device 14. Communication device 14 is preferably powered by three volts received via pins 14 through 16 when it is interfaced with serial port adapter 12a.

Figure 5B:
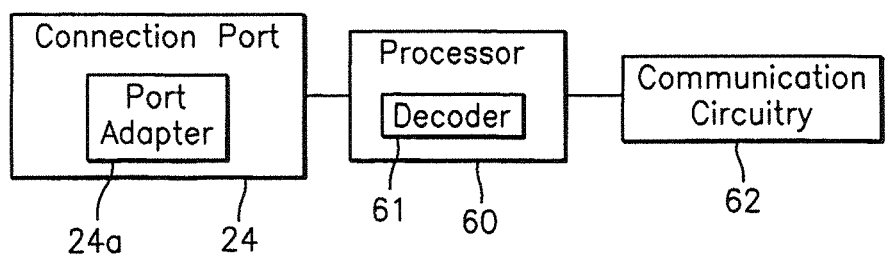

With reference to FIG. 5b, communication device 14 is preferably a plug-and-play PCMCIA-type card 64 or other type of memory card having processor 60 and a serial connection port 24a for connecting to serial port adaptor 12a of communication interface 12. As stated above, processor 60 executes application software stored within a memory for receiving measurement and other data via the connection port-serial port adaptor connection and communicating the received measurement and other data to the central computer station via communication circuitry 62 and via one or more communications networks, such as PSTN, cellular network, satellite network, Internet, Ethernet, Intranet, LAN, WAN, etc., of a communications infrastructure according to a communications protocol, such as CDMA, TDMA, 3G, Internet protocol, Bluetooth, etc., pre-programmed within processor 60.

Processor 60 communicates the measurement and other data to the central computer station via communication circuitry 62 which includes the appropriate hardware, such as, for example, an antenna, RF transmission means (RF transmitter and receiver), modem, telephone jack, Ethernet jack, broadband connection, DSL connection, etc., for transmitting the measurement and other data.

Communication device 14 may also be, for example, a cellular phone having a port connector capable of connecting to communication interface 12 for receiving the measurement and other data via the port connector-communication interface connection and for transmitting the measurement and other data to the central computer station via a CDMA cellular communications network according to the CDMA communications protocol. Communication device 14 may also be, for example, a PDA having a port connector capable of connecting to communication interface 12 for receiving the measurement and other data via the port connector-communication interface and for transmitting the received measurement and other data to a PSTN, from where it is transmitted through the Internet according to the Internet protocol, and then to another PSTN connected to the central computer station.

Hence, in accordance with the present disclosure, an individual or company representative can install a meter equipped with a communication interface 12 which can later be interfaced with a communication device 14 capable of transmitting data over a particular communications network according to a particular communications protocol.

The present disclosure further provides a kit having a meter 10 and a communication device 14. The present disclosure also provides a method for effectively and inexpensively switching from a first communications infrastructure to a second communications infrastructure for receiving measurement data at a central or remote computer station from a plurality of meters 10. Each meter 10 includes a measurement module 50 for obtaining measurement data; and a communication interface 12 configured for receiving the measurement data. The method includes the step of interfacing each of the plurality of meters 10 with a first communication device via the communication interface 12. The first communication device is adapted to communicate with the central computer station via the first communications infrastructure. The method further includes the step of removing the first communication device from each of the plurality of meters 10 and interfacing each of the plurality of meters 10 with a second communication device via the communication interface. The second communication device is adapted to communicate with the central computer station via the second communications infrastructure.

It will be understood that various modifications may be made to the embodiments disclosed herein. Therefore, the above description should not be construed as limiting, but merely as exemplifications of the various embodiments. Those skilled in the art will envision other modifications within the scope and spirit of the claims appended hereto.

What is claimed is:

1. An apparatus comprising:
   a housing having an interior space and an interface opening in a wall of the housing, the interface opening configured to receive at least one removable communication device provided externally from the housing such that the at least one removable communication device is at least partially disposed in the housing;
   a measurement module disposed in the interior space of the housing, the measurement module configured to measure electrical energy parameters;
   a first processor disposed in the interior space of the housing and coupled to the measurement module, the first processor configured to process the measured electrical energy parameters;

a display having a face viewable from an exterior space outside the housing, the display configured to receive control signals from the first processor to display energy consumption data to an operator;

a memory disposed in the interior space of the housing, the memory configured to store application software capable of being executed by the first processor;

a communication interface disposed in the interior space of the housing and coupled to the first processor, the communication interface comprising a port adaptor externally accessible from the housing via the interface opening;

a plurality of removable communication devices, each removable communication device comprising a connection port disposed thereon and configured for physically and removably coupling with the port adaptor of the communication interface, each removable communication device further comprising a second processor programmed with a communication protocol that is different from the communication protocols of the other removable communication devices, and each removable communication device further comprising communication circuitry configured to transmit data to a remote computing device via the respective communication protocol over a predetermined infrastructure having one or more communication networks;

wherein, once one of the removable communication devices providing externally from the housing is disposed in the interface opening, the connection port of the removable communication device connects to the port adapter of the communication interface and the removable communication device is removable from the housing without opening the housing to expose the interior space of the housing; and wherein the communication interface is configured to communicate the electrical energy parameters to the removable communication device coupled to the communication interface for further transmission to the remote computing device via the one or more communication networks.

2. The apparatus of claim 1, wherein the port adaptor of the communication interface is an edge connector.

3. The apparatus of claim 1, wherein the port adaptor of the communication interface is a serial port adaptor.

4. The apparatus of claim 3, wherein the serial port adaptor is configured to supply power to the removable communication device coupled to the communication interface.

5. The apparatus of claim 3, wherein the serial port adaptor includes a plurality of pins.

6. The apparatus of claim 1, wherein the port adaptor of the communication interface is one of an Ethernet network adaptor, a cellular network adaptor, and a Bluetooth adaptor.

7. The apparatus of claim 1, wherein at least one of the removable communication devices is a PCMCIA-type card.

8. The apparatus of claim 1, wherein the communication circuitry of at least one of the removable communication devices is configured to transmit the data to the computing device via at least one of RF transmission, cellular transmission, and/or satellite transmission.

9. The apparatus of claim 8, wherein the communication circuitry of the at least one of the removable communication devices further comprises an antenna.

10. The apparatus of claim 1, wherein the communication circuitry of at least one of the removable communication devices further comprises at least one of an RF transmitter and receiver, an Ethernet jack, and/or a modem.

11. The apparatus of claim 1, wherein the one or more communication networks is selected from the group consisting of a PSTN, a cellular network, a satellite network, an Ethernet/Intranet/LAN/ WAN, and the Internet.

12. The apparatus of claim 1, wherein the removable communication devices operate within at least one of a Bluetooth communications protocol, a CDMA communications protocol, a TDMA communications protocol, an Internet protocol, and/or a 3G communications protocol.

13. The apparatus of claim 1, wherein the housing is generally cylindrical.

14. A meter comprising:

a meter housing defining an interior space;

a measurement module disposed within the interior space of the meter housing, the measurement module configured to measure parameters of utility usage;

a processor disposed within the interior space of the meter housing and coupled to the measurement module, the processor configured to process the parameters of utility usage measured by the measurement module; and an external communication interface disposed within the interior space of the meter housing and externally accessible via an opening within a wall of the meter housing, a first side of the external communication interface being coupled to the processor, a second side of the external communication interface configured to communicate with a removable, wireless communication device when the removable, wireless communication device is disposed in the opening and physically and directly connected to the second side of the external communication interface, wherein the opening is configured to at least partially receive the removable, wireless communication device provided externally from the housing such that an operator is capable of coupling the removable, wireless communication device to and removing the removable, wireless communication device from the external communication interface without opening the meter housing, the removable, wireless communication device being selected to match a predetermined communication infrastructure including at least one wireless network.

15. The meter of claim 14, wherein the external communication interface comprises a port adaptor.

16. The meter of claim 15, wherein the port adaptor comprises a plurality of pins.

17. The meter of claim 14, wherein the external communication interface is configured to receive the processed parameters of utility usage from the processor and communicate the processed parameters of utility usage to the removable, wireless communication device.

18. The meter of claim 14, wherein the second side of the external communication interface comprises a port adaptor configured for connection with a connection port of the removable, wireless communication device.

19. The meter of claim 18, wherein the port adaptor of the external communication interface is one of a serial port adaptor, an edge connector, Ethernet network adaptor, cellular network adaptor, and Bluetooth adaptor.

20. The meter of claim 14, wherein the housing is generally cylindrical.

21. The meter of claim 14, wherein the removable, wireless communication device operates within at least one of a Bluetooth communications protocol, a CDMA communications protocol, a TDMA communications protocol, an Internet protocol, and/or a 3G communications protocol.

22. An apparatus comprising:
a housing having an interior space and an opening, the opening configured to physically receive at least one of a plurality of removable, wireless communication cards from outside the housing such that the at least one removable, wireless communication card is at least partially disposed in the housing;
a measurement module disposed in the interior space of the housing for obtaining measurement data indicative of energy consumed;
at least one first processor disposed in the interior space of the housing and coupled to the measurement module, the at least one first processor configured to process the measurement data; and
a communication interface coupled to the at least one processor, the communication interface externally accessible via the opening of the housing, wherein the opening of the housing enables the at least one removable, wireless communication card to be physically and removably coupled to the communication interface without opening the housing to expose the interior space of the housing, the communication interface being configured for receiving the measurement data from at least one processor and for operatively communicating the measurement data to the at least one removable, wireless communication card;
wherein each of the plurality of removable, wireless communication cards includes a connection port disposed thereon and configured for physical and removable coupling with the communication interface when the card is disposed in the opening of the housing, at least one second processor programmed with a communication protocol, and communication circuitry being configured for wirelessly transmitting the measurement data to a remote computing device via the respective communication protocol over a predetermined communication infrastructure having one or more communication networks, the communication protocol of each of the plurality of removable, wireless communication cards being different than the communication protocol of the other removable, wireless communication cards.

* * * * *